(12) United States Patent
Ziolkowski

(10) Patent No.: US 8,427,165 B2
(45) Date of Patent: *Apr. 23, 2013

(54) MARINE EM EXPLORATION

(75) Inventor: Antoni Marjan Ziolkowski, Edinburgh (GB)

(73) Assignee: PGS EM Limited, Edinburgh (GB)

( * ) Notice: Subject to any disclaimer, the term of this patent is extended or adjusted under 35 U.S.C. 154(b) by 695 days.

This patent is subject to a terminal disclaimer.

(21) Appl. No.: 12/449,043

(22) PCT Filed: Feb. 11, 2008

(86) PCT No.: PCT/GB2008/000467
§ 371 (c)(1),
(2), (4) Date: Jan. 20, 2010

(87) PCT Pub. No.: WO2008/099151
PCT Pub. Date: Aug. 21, 2008

(65) Prior Publication Data
US 2010/0134110 A1 Jun. 3, 2010

(30) Foreign Application Priority Data
Feb. 12, 2007 (GB) .................. 0702661.0

(51) Int. Cl.
*G01V 3/00* (2006.01)
(52) U.S. Cl.
USPC .............................. 324/365; 324/334; 324/337
(58) Field of Classification Search .................. 324/334, 324/337, 365
See application file for complete search history.

(56) References Cited

U.S. PATENT DOCUMENTS

| | | | |
|---|---|---|---|
| 7,982,465 B2 | 7/2011 | Westerdahl et al. | |
| 8,099,239 B2 * | 1/2012 | MacGregor et al. | 702/5 |
| 8,264,227 B2 * | 9/2012 | Ziolkowski | 324/334 |
| 2004/0239330 A1 | 12/2004 | Weaver et al. | |
| 2007/0061078 A1 * | 3/2007 | Lu et al. | 702/2 |
| 2008/0150538 A1 * | 6/2008 | Andreis | 324/365 |
| 2009/0278541 A1 | 11/2009 | Westerdahl et al. | |
| 2012/0011130 A1 | 1/2012 | Loseth et al. | |

FOREIGN PATENT DOCUMENTS

| | | |
|---|---|---|
| WO | WO 03/023452 | 3/2003 |
| WO | WO 03/048812 | 6/2003 |
| WO | WO 2005/010560 | 2/2005 |
| WO | WO 2007/094676 | 8/2007 |

OTHER PUBLICATIONS

First Office Action for Chinese Patent Application No. 200880004684.5, Mailing Date: Aug. 24, 2011.
David Wright, Anton Ziolkowski, Bruce Hobbs, (2002), "Hydrocarbon detection and monitoring with a multicomponent transient electromagnetic (MTEM) survey", The Leading Edge, pp. 852-864.
J. H. Coggon, H. F. Morrison, (1970), "Electromagnetic investigation of the sea floor", Geophysics, vol. 35, No. 3, pp. 476-489.
S, E, Johansen, H. E. F. Amundsen, T. Røsten, S. Ellingsrud, T. Eidesmo, A. H. Bhuyian, (2005), "Subsurface hydrocarbons detected by electromagnetic sounding", First Break, vol. 23; pp. 31-36.

* cited by examiner

*Primary Examiner* — Bot Ledynh

(57) ABSTRACT

A method for removing the effects of an airwave from marine electromagnetic data comprising providing an electromagnetic source and at least one receiver in the water; measuring the electromagnetic response at a first source-receiver separation; determining a scaled version of the airwave response at a source-receiver separation where the earth response is negligible and using the scaled airwave response to determine the earth response measured at the first separation. Using this method, an improved estimate of the earth's response can be achieved.

17 Claims, 5 Drawing Sheets

MARINE EM EXPLORATION

CROSS REFERENCE TO RELATED APPLICATION

The present application is the U.S. national stage application of International Application PCT/GB2008/000467, filed on Feb. 11, 2008, which international application was published on Aug. 21, 2008 as International Publication WO 2008/099151. The International Application claims priority of United Kingdom Patent Application GB 0702661.0 filed on Feb. 12, 2007.

The present invention relates to a method for removing the airwave from marine electromagnetic data. In particular, the invention relates to a technique for reducing the impact of the airwave in marine based multi-channel transient electromagnetic (MTEM) measurements.

BACKGROUND OF THE INVENTION

Porous rocks are saturated with fluids. The fluids may be water, gas, or oil, or a mixture of all three. The flow of current in the earth is determined by the resistivities of such rocks, which are affected by the saturating fluids. For instance, brine-saturated porous rocks are much less resistive than the same rocks filled with hydrocarbons. By measuring the resistivity of geological formations, hydrocarbons can be detected. Hence, resistivity measurements can be made in an exploration phase to detect hydrocarbons prior to drilling.

Various techniques for measuring the resistivity of geological formations are known, for example time domain electromagnetic techniques, as described in WO 03/023452, the contents of which are incorporated herein by reference. Conventionally, time domain electromagnetic investigations use a transmitter and one or more receivers. The transmitter may be an electric source, that is, a grounded bipole, or a magnetic source, that is, a current in a wire loop or multi-loop. The receivers may be grounded bipoles for measuring potential differences, or wire loops or multi-loops or magnetometers for measuring magnetic fields and/or the time derivatives of magnetic fields. The transmitted signal is often formed by a step change in current in either an electric or magnetic source, but any transient signal may be used, including, for example, a pseudo-random binary sequence. Measurements can be taken on land or in an underwater environment.

FIG. 1 shows a view of a typical setup for transient electromagnetic marine surveying. This has a bi-pole current source with mid-point $x_s$ on or near the sea floor for transmitting a transient current between two electrodes. The time function of the current might be a simple step change in current or a more complicated signal such as a pseudo-random binary sequence. The response of the earth-water system is measured by a line of bi-pole receivers on or near the sea floor, each receiver characterised by its mid-point position $x_r$, and measuring the potential difference between a pair of electrodes. All the electrodes are essentially in the same vertical plane.

In use, the electromagnetic signal generated by the source of FIG. 1 can follow three transmission paths to the receiver electrodes, these being directly through the earth, directly through the water, and via the water through the air and back through the water again. The signal transmitted by this third path is known as the airwave. In deep water, the airwave has a negligible impact. In contrast in shallow water, the signal that is transmitted through the water is negligible, but the airwave can have a significant impact and so make interpretation of the data difficult.

SUMMARY OF THE INVENTION

According to one aspect of the present invention, there is provided a method for removing the effects of an airwave from marine electromagnetic data comprising providing a source and at least one receiver in the water; measuring the electromagnetic response at a first source-receiver separation; determining a scaled version of the airwave response at a source-receiver separation where the earth response is negligible and using the scaled airwave response to determine the earth response measured at the first separation. The step of determining the scaled airwave may involve measuring or estimating the airwave response.

For an impulsive source current, the airwave response decays approximately as the cube of the source-receiver separation at separations large compared with the water depth, whereas the response of the component travelling directly through the earth decays approximately as the fifth power of the source-receiver separation. At very large offsets, therefore, the airwave dominates the total response. Hence, by measuring the electromagnetic response at a large source-receiver separation where the earth response is negligible, a measure of the airwave at that source receiver separation can be determined. This is a scaled version of the airwave response at the first source-receiver measurement separation, and can be used to allow removal of the airwave from the measured data and consequently a more accurate measure of the earth response at the first source-receiver separation.

Using the scaled airwave response to determine the earth response may involve finding an inverse filter f(t) of the scaled airwave response â(t); convolving the inverse filter f(t) with the measured data x(t) to compress the airwave to an impulse; removing the airwave impulse from the result of the convolution with the air wave data and convolving the result with the scaled determined airwave â(t) to recover the earth response without the airwave.

Preferably, the source is a current bi-pole or a magnetic loop. Preferably, the receiver is a bi-pole receiver or a magnetic loop. Preferably, the source and receiver are located on or near the seabed.

The electromagnetic measurements are transient electromagnetic measurements; that is, the response to the input signal at the source must have reached essentially steady state before the measurement is complete.

Preferably, the larger source-receiver separation is approximately five or more times greater than the shorter separation. Ideally, both source-receiver separations are at least five times greater than the depth of the water.

The larger source-receiver separation is selected so that the earth response measured at the receiver is substantially zero.

According to another aspect of the present invention, there is provided a computer program, preferably on a computer readable medium or data carrier, for removing the effects of an airwave from marine electromagnetic data as measured by at least one source and at least one receiver, the computer program having code or instructions for using an airwave response at a source-receiver separation where the earth response is negligible to allow removal of an airwave response in measurements at a shorter source-receiver separation, thereby to allow the earth response to be determined.

Preferably, the larger separation is approximately five or more times greater than the shorter separation.

Preferably, the larger separation is selected so that the earth response measured at the receiver is substantially zero.

Preferably, the program has code or instructions for subtracting the determined airwave from the measurement at the shorter separation.

According to yet another aspect of the invention, there is provided a system for determining the earth response to an electromagnetic signal using an electromagnetic source and at least one receiver in water, the system being adapted to measure the electromagnetic response at a first source-receiver separation; determine the airwave response or a scaled version thereof at a source-receiver separation where the earth response is negligible and use the determined airwave response to determine the earth response measured at the first separation.

The system may be adapted to use the airwave response to determine the earth response involves finding an inverse filter f(t) of the scaled airwave response â(t); convolve the filter f(t) with the measured response at the first source-receiver separation to provide a result that includes an airwave impulse; remove the airwave impulse from the result of the convolution and convolve the remainder with the determined airwave response â(t) to recover the earth response at the first source-receiver separation without the airwave.

A system may be adapted to determine the earth response by measuring or estimating the airwave response.

The larger separation may be approximately five or more times greater than the shorter separation. Both separations may be at least five times greater than the depth of the water.

The larger separation may be selected so that the earth response measured at the receiver is substantially zero.

The source may be a current bi-pole or a magnetic loop. The receiver may be a bi-pole receiver or a magnetic loop.

The source and receiver may be located on or near the seabed.

According to still another aspect of the present invention, there is provided a method of measuring an electromagnetic response, the method comprising positioning an electromagnetic source and at least one electromagnetic receiver underwater; transmitting an electromagnetic signal from the source to the receiver, wherein the transmitted signal comprises an earth component and an airwave component, and the receiver is positioned relative to the source so that the measured response is substantially due to the airwave.

In any aspect of the invention, the transmitted signal may be formed by a step change in current in either an electric or magnetic source, although any transient signal may be used, including, for example, a pseudo-random binary sequence.

BRIEF DESCRIPTION OF THE DRAWINGS

Various aspects of the invention will now be described by way of example only and with reference to the accompanying drawings, of which:

FIG. 3(*a*) shows the response out to 9 s, and FIG. 3(*b*) shows it out to 1 s;

FIG. 4 (*a*) shows the response out to 9 s, and FIG. 4 (*b*) shows it out to 1 s;

DETAILED DESCRIPTION OF THE DRAWINGS

The present invention provides a method for removing the effects of an airwave from shallow water marine electromagnetic data. The invention will be illustrated using the model of FIG. 2, which shows a seawater layer of depth d and resistivity $\rho_w$ overlying a homogeneous isotropic halfspace. The dipole source is on the sea floor and the in-line electric field is calculated at a receiver position at some offset r from it on the sea floor. For the sake of example, it will be assumed that the water layer is 100 m deep and has a resistivity of 0.3 ohm-m, and the half space has a resistivity of 1 ohm-m.

Figure 1:
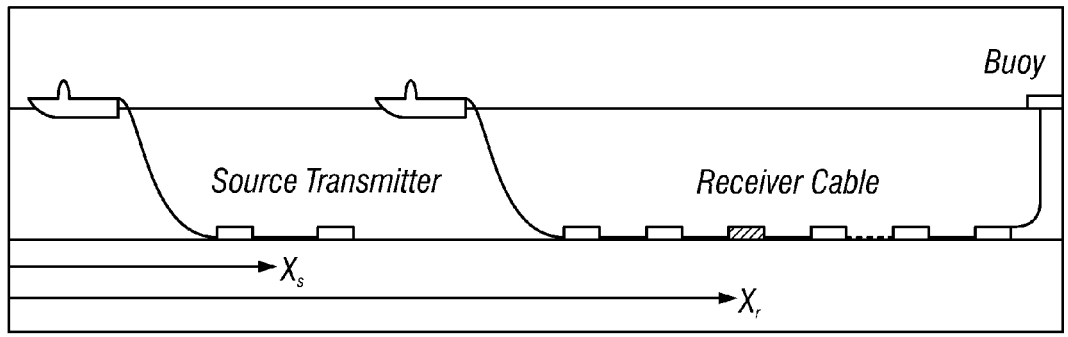
Figure 2:
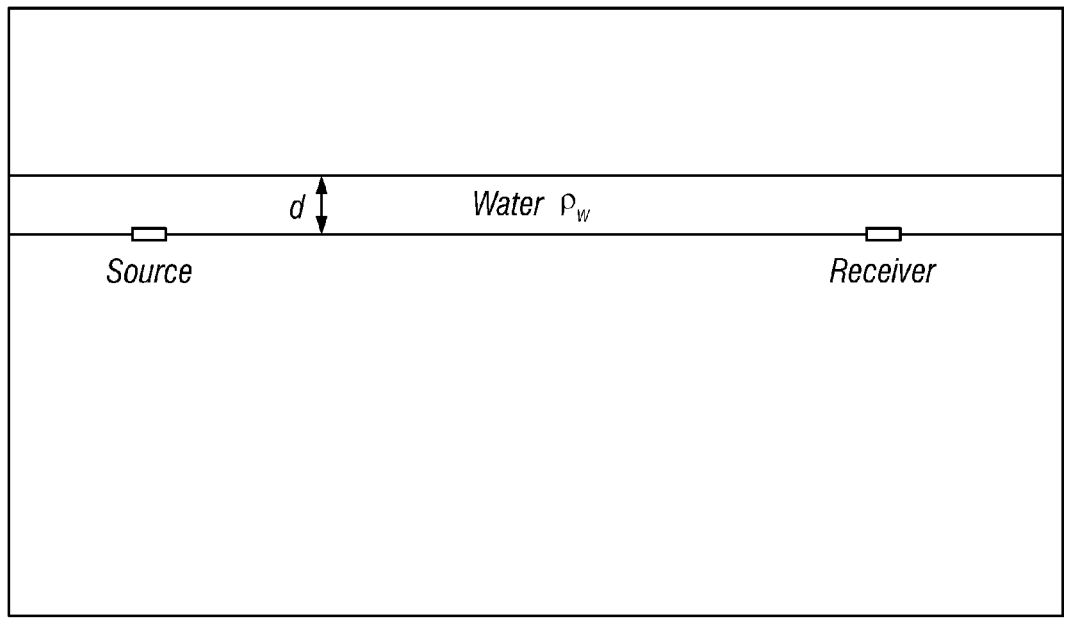
FIG. 2 is a model of the system of FIG. 1.
Figure 3A:
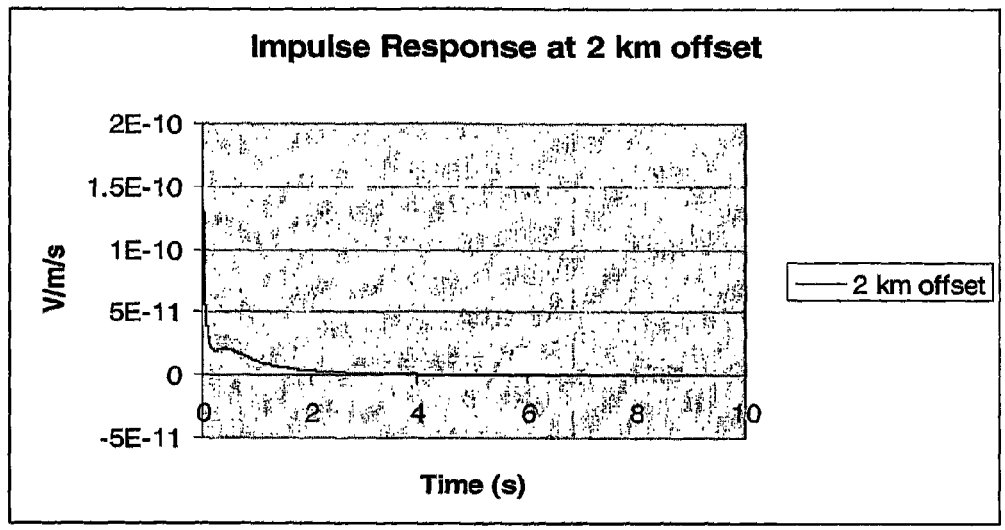
FIG. 3 shows an impulse response at 2 km for the arrangement of FIG. 2 in which the earth resistivity is 1 ohm-m.
Figure 3B:
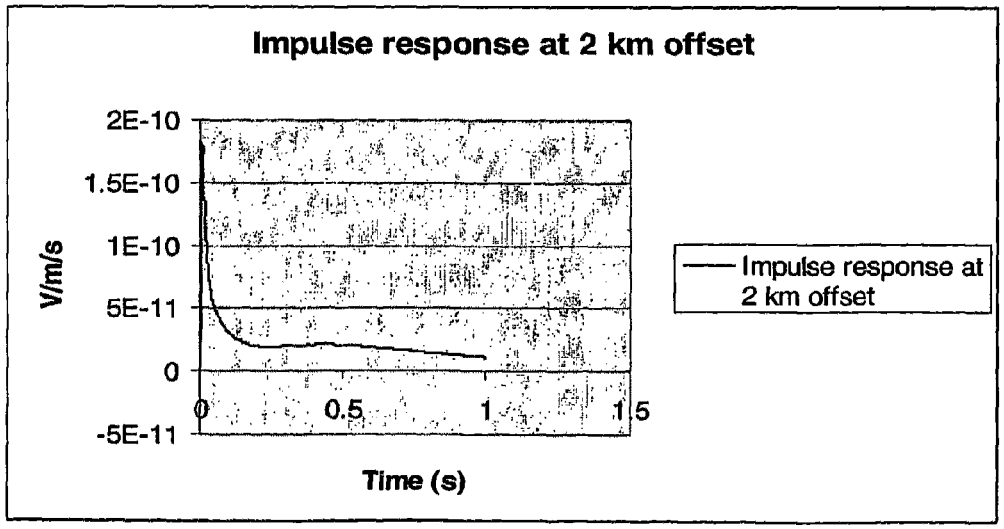

FIG. 3 shows an impulse response at 2 km for the arrangement of FIG. 2. FIG. 3(*a*) shows the response out to 9 s, and FIG. 3(*b*) shows it out to 1 s. A sharp initial peak occurs at 0.008 s and has an amplitude of 1.82E-10 V/m/s. This is the airwave. This has a finite rise time to the peak and a long tail. There is a second much broader peak at about 0.45 s with an amplitude of 2.4E-11 V/m/s. This is caused by the earth response. The objective is to separate the airwave and the earth impulse response.

At a given offset and after deconvolution for the system response, the impulse response data, which are causal, can be expressed as:

$$x(t)=a(t)+g(t), t\geq 0,$$

$$x(t)=0, t<0. \quad (1)$$

in which a(t) is the air wave and g(t) is the earth impulse response, with g(0)=0. Suitable deconvolution techniques are described for example by Wright, D., et al in the article Hydrocarbon detection and monitoring with a multichannel transient electromagnetic (MTEM) survey: The Leading Edge, 21, 852-864.

The airwave is expected to be minimum-phase. By this it is meant that without the water the airwave is an impulse and the propagation effects in the water must be factors involving decaying exponentials, which are minimum-phase.

An estimate â(t) of the air wave is assumed such that $$A\hat{a}(t) \approx a(t). \quad (2).$$

This is an estimate of the shape, but the exact airwave amplitude A is not known. Next a filter f(t) has to be found, such that $$f(t)*\hat{a}(t)=\delta(t), \quad (3)$$

in which the asterisk denotes convolution and δ(t) is the impulse function:

$$\delta(t)=0, t\neq 0$$

$$\int_{-\infty}^{\infty}\delta(t)dt=1. \quad (4)$$

As mentioned above a(t) and hence â(t) are expected to be minimum-phase. Therefore the inverse f(t) is causal, realizable and minimum-phase; that is, it exists only for t≥0, and it has finite amplitude.

Convolving the filter f(t) with the data yields $$f(t)*x(t)=f(t)*A\hat{a}(t)+f(t)*g(t)=A\delta(t)+f(t)*g(t). \quad (5)$$

Now the airwave is removed by considering only t>0, so that:

$$f(t)*x(t)=f(t)*g(t), t>0, \quad (6)$$

This result can then be convolved with â(t):

$$\hat{a}(t)*f(t)*g(t)=\delta(t)*g(t)=g(t). \quad (7)$$

This allows the earth impulse as measured to be recovered, but without the airwave. This is what is needed, and it turns out that the unknown amplitude factor A is irrelevant. Hence, by merely having an estimate or measure of the shape of the airwave, the earth impulse can be determined.

Because of the presence of noise, an exact inverse of â(t) cannot be used. First equation (1) is re-written to include the noise:

$$x(t)=a(t)+g(t)+n(t) \quad (8)$$

Then equation (2) is modified to define a new filter $f_1(t)$, such that $$f_1(t)*\hat{a}(t)=d(t-\tau), \quad (9)$$

in which d(t) is a band-limited impulse whose integral is unity, for example a Gaussian, of the form $d(t)=\alpha\exp(-\pi\alpha^2 t^2)$ with $\alpha$ a frequency close to the highest frequency of interest in the data, and $\tau$ is a time delay introduced to make $f_1(t)$ causal. The integral of d(t) is 1. Convolving this filter with the data yields $$f_1(t)*x(t)=f_1(t)*A\hat{a}(t)+f_1(t)*g(t)+f_1(t)*n(t) \approx Ad(t-\tau)+f_1(t)*g(t)+f_1(t)*n(t)=y(t). \quad (10)$$

The value of $\alpha$ is chosen to be as large as possible but not so large that the high frequency components of the noise are amplified too much. Then $$d(t)\approx 0 \text{ for values of } |t|>3/\alpha. \quad (11)$$

The function y(t) is set to zero for $|t-\tau|\leq 3/\alpha$ to yield z(t). That is, $$z(t)\approx f_1(t)*g(t)+f_1(t)*n(t), t-\tau>3/\alpha. \quad (12)$$

The approximate inverse of $f_1(t)$ is â(t), as defined in equation (9).

Then â(t) is convolved with z(t) to yield $$\hat{a}(t)*z(t)\approx \hat{a}(t)*f_1(t)*g(t)+\hat{a}(t)*f_1(t)*n(t)\approx d(t-\tau)*g(t)+d(t-\tau)*n(t)\approx g(t-\tau)+n(t-\tau). \quad (13)$$

Apart from the known time delay $\tau$ this is what is desired, plus noise. The time delay can easily be removed.

The shape of the airwave can be estimated by looking at an offset that is large compared with this offset and where the attenuation of the earth response is relatively high. It is suspected that the shape of the airwave is invariant with offset for a 1-D earth—beyond a certain offset—and the hypothesis is that an almost pure airwave could be measured, if the offset is large enough and the time window restricted. This gives an estimate of the shape of the airwave, which according to the method described above would allow the effects of the airwave at the measurement source-receiver separations to be removed.

Figure 4A:
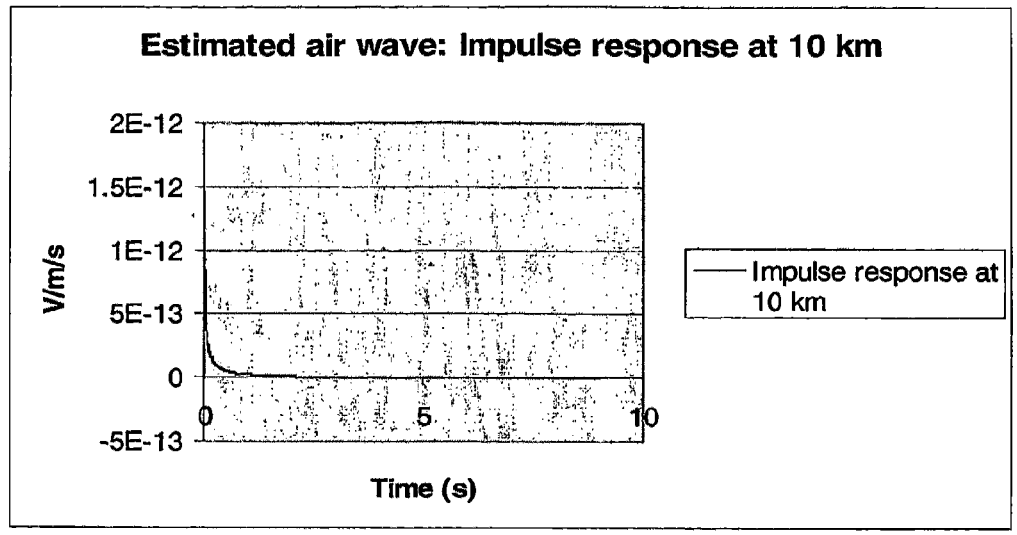
FIG. 4 shows the impulse response at 10 km offset for a 1 ohm-m half-space beneath 100 m of water, where the dipole source and receiver are on the sea floor.
Figure 4B:
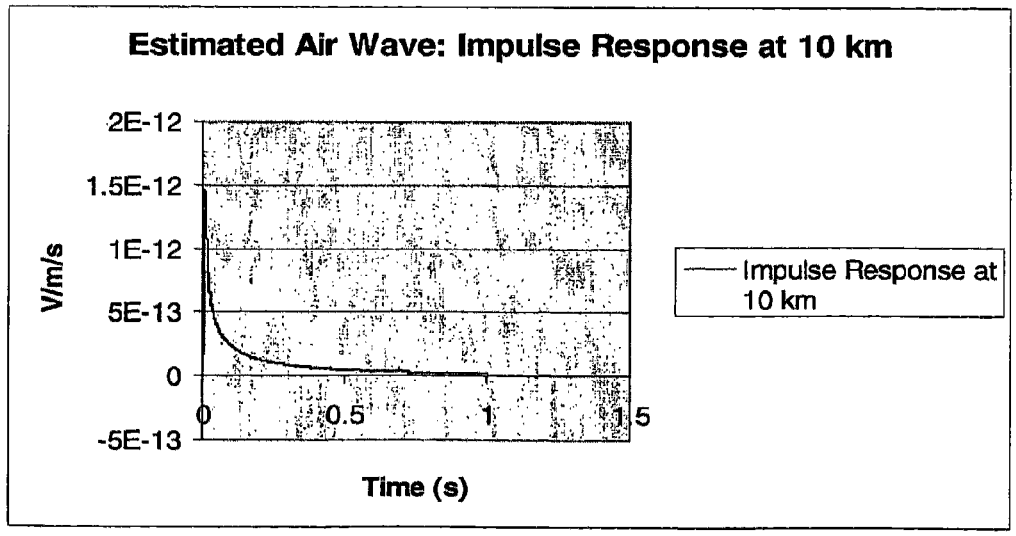

FIG. 4 shows the impulse response at 10 km offset for a 1 ohm-m half space beneath 100 m of water, where the dipole source and receiver are on the sea floor. FIG. 4 (a) shows the response out to 9 s, and FIG. 4 (b) shows it out to 1 s. The sharp initial peak occurs at 0.008 s and has an amplitude of 1.46E-12 V/m/s. There is no discernible second peak. It should be noted that the peak of the airwave occurs at exactly the same time as for the 2 km impulse response.

Figure 5:
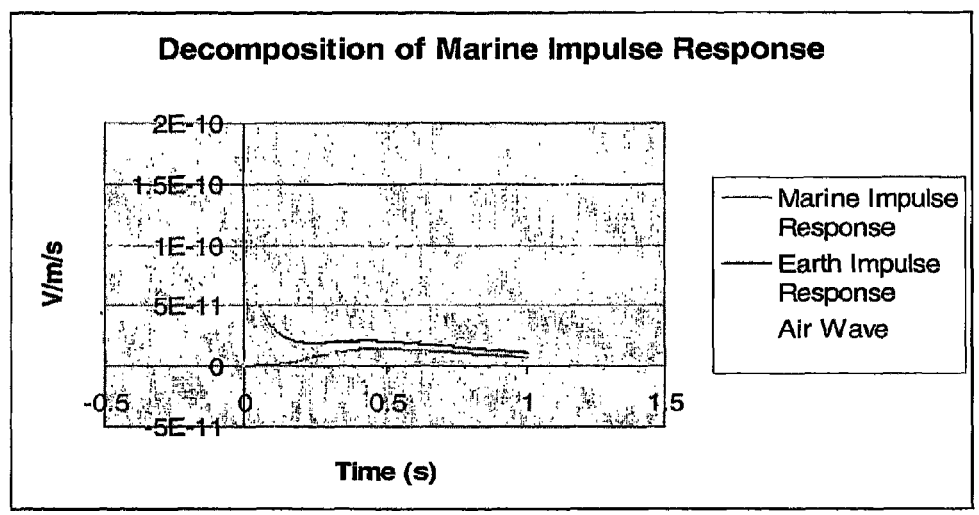
FIG. 5 shows the marine impulse response, the earth impulse response and the airwave for a 2 km offset measurement, and FIGS. 6(*a*) and (*b*) show the result of removing the airwave from the impulse responses of FIG. 3.
Figure 6:
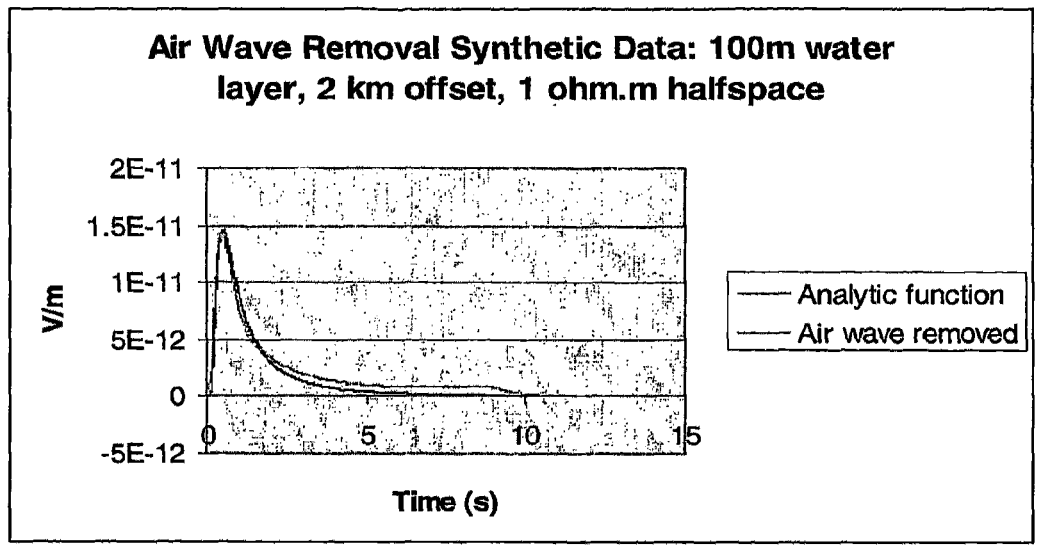
Figure 6:
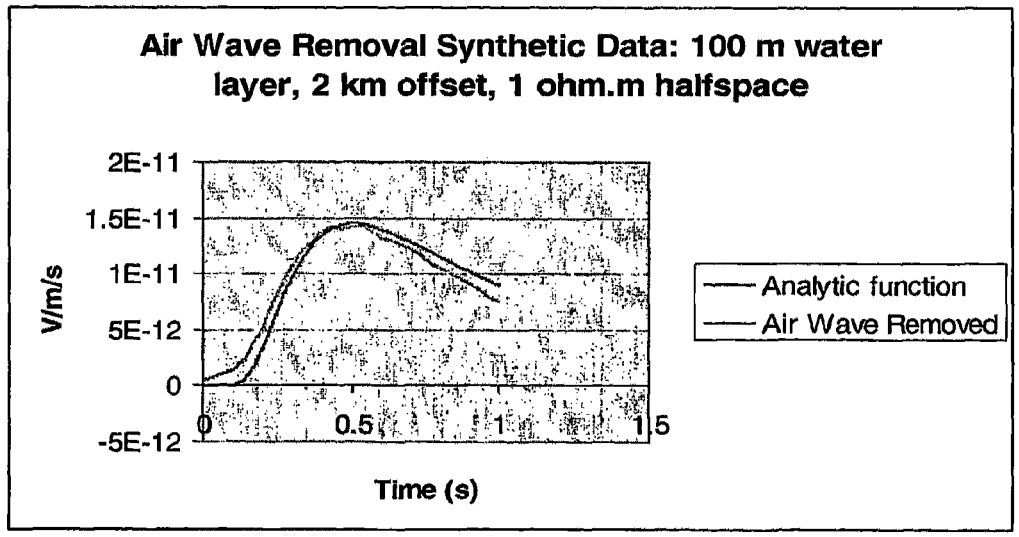

FIG. 5 shows the marine impulse response, the earth impulse response and the airwave for a 2 km offset measurement. The earth impulse response was obtained according to the scheme described above; the airwave was obtained by subtracting the earth impulse response from the marine impulse response. A measure of the quality of this result is to compare the recovered impulse response with the analytic function: the impulse response of a 1 ohm-m half space at an offset of 2 km. FIG. 6 shows the result of removing the airwave from the impulse responses shown in FIG. 3. This is very similar to the analytic function for the impulse response of a 1 ohm-m half space. In particular the time and amplitude of the peak of the two functions are in close agreement.

The present invention provides a very simple and effective technique for removing the airwave from measured MTEM data. This can be summarised as follows: estimate the shape of the airwave using an airwave at a large source-receiver separation and find a filter f(t) based on the estimated airwave. This filter is then convolved with the measured data x(t). The result of this is very messy data, but there is a very sharp peak at time $t=\tau$. This is the airwave. The airwave peak is then sliced out. The remaining data is returned to its original state by convolving it with the scaled airwave a(t). This operation undoes the effect of convolving with the filter f(t). The result is the original data, i.e. the earth response, without the airwave.

The data captured may be processed in accordance with the invention using any suitable hardware or software.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

What is claimed is:

1. A method for determining the earth response to an electromagnetic signal using a source for transmitting the electromagnetic signal to at least one receiver in water, the method comprising:
   measuring an first electromagnetic response at a first source-receiver seperation;
   measuring a second electromagnetic response at a larger second source-receiver seperation where the earth response is negligible;
   determining from the second electromagnetic response the airwave response at the second source-receiver separation; and
   using the determined airwave response and the measured first electromagnetic response to determine the earth response at the first source-receiver separation,
   wherein using the determined airwave response and the measured first electromagnetic response to determine the earth response involves:
     finding an inverse filter f(t) of the determined airwave response â(t);
     convolving the filter f(t) with the measured response at the first source-receiver seperation to provide a result that includes an airwave impulse;
     removing the airwave impulse from the result of the convolution; and
     convolving the remainder with the determined airwave response â(t) to recover the earth response at the first source-receiver separation without the airwave;
     wherein the earth response comprises a signal with a transmission path directly through the earth.

2. A method as claimed in claim 1 wherein the step of determining the earth response involves measuring or estimating the airwave response at the second source-receiver separation.

3. A method as claimed in claim 1 wherein determining the airwave response involves estimating its shape.

4. A method as claimed in claim 1 wherein the second source-receiver separation is approximately five or more times greater than the first source-receiver separation.

5. A method as claimed in claim 1 wherein both the first and the second source-receiver separations are at least five times greater than the depth of the water.

6. A method as claimed in claim 1 wherein the second source-receiver separation is selected so that the earth response measured at the receiver is substantially zero.

7. A method as claimed in claim 1 wherein the source is a current bi-pole or a magnetic loop.

8. A method as claimed in claim 1 the receiver is a bi-pole receiver or a magnetic loop.

9. A method as claimed in claim 1 comprising locating the source and receiver on or on the seabed.

10. A system for determining the earth response to an electromagnetic signal comprising:
    an electromagnetic source;
    at least one receiver in water, the at least one receiver being adapted to:
        measure a first electromagnetic response at a first source-receiver separation; and
        measure a second electromagnetic response at a second source-receiver separation where the earth response is negligible; and
    a processor, the processor being adapted to:
        determine from the second electromagnetic response the airwave response at the second source-receiver separation; and
        use the determined airwave response and the measured first electromagnetic response to determine the earth response at the first source-receiver separation by:
            finding an inverse filter f(t) of the determined airwave response â(t);
            convolving the filter f(t) with the measured response at the first source-receiver separation to provide a result that includes an airwave impulse;
            removing the airwave impulse from the result of the convolution; and
            convolving the remainder with the determined airwave response â(t) to recover the earth response at the first source-receiver separation without the airwave;
        wherein the earth response comprises a signal with a transmission path directly through the earth.

11. A system as claimed in claim 10 that is adapted to determine the earth response by measuring or estimating the airwave response at the second source-receiver separation.

12. A system as claimed in claim 10 wherein the second source-receiver separation is approximately five or more times greater than the first source-receiver separation.

13. A system as claimed in claim 10 wherein both the first and second source-receiver separations are at least five times greater than the depth of the water.

14. A system as claimed in claim 10 wherein the second source-receiver separation is selected so that the earth response measured at the receiver is substantially zero.

15. A system as claimed in claim 10 wherein the source is a current bi-pole or a magnetic loop.

16. A system as claimed in claim 10 wherein the receiver is a bi-pole receiver or a magnetic loop.

17. A system as claimed in claim 10 wherein the source and receiver are located on or near the seabed.

\* \* \* \* \*